(12) United States Patent
Rocher et al.

(10) Patent No.: US 8,764,315 B2
(45) Date of Patent: Jul. 1, 2014

(54) CONNECTOR FOR A FIBER PROBE AND A FIBER PROBE ADAPTED TO SAID CONNECTOR

(75) Inventors: Alexandra Rocher, Nogent sur Marne (FR); Francois Doussoux, Meudon (FR); Sophie Clade, Boulogne-Billancourt (FR); Sylvain Petit, Gif sur Yvette (FR); Nicolas Boularot, Champigny-sur-Marne (FR)

(73) Assignee: Mauna Kea Technologies, Paris (FR)

( * ) Notice: Subject to any disclaimer, the term of this patent is extended or adjusted under 35 U.S.C. 154(b) by 229 days.

(21) Appl. No.: 13/255,249

(22) PCT Filed: Mar. 12, 2010

(86) PCT No.: PCT/IB2010/000969
§ 371 (c)(1),
(2), (4) Date: Sep. 8, 2011

(87) PCT Pub. No.: WO2010/103406
PCT Pub. Date: Sep. 16, 2010

(65) Prior Publication Data
US 2011/0317963 A1 Dec. 29, 2011

Related U.S. Application Data

(60) Provisional application No. 61/159,709, filed on Mar. 12, 2009.

(51) Int. Cl.
*G02B 6/36* (2006.01)
(52) U.S. Cl.
USPC .............................................. 385/79; 385/78

(58) Field of Classification Search
USPC ...................................................... 385/78, 79
See application file for complete search history.

(56) References Cited

U.S. PATENT DOCUMENTS

| 3,790,791 A * | 2/1974 | Anderson ................ 250/227.24 |
| 3,912,362 A | 10/1975 | Hudson |
| 4,116,655 A | 9/1978 | Lewis |

(Continued)

FOREIGN PATENT DOCUMENTS

| DE | 23 63 984 A1 | 6/1975 |
| JP | S55-129028 A | 10/1980 |

(Continued)

OTHER PUBLICATIONS

International Search Report from PCT/IB2010/000969 dated Jul. 20, 2010 (3 pages).

(Continued)

*Primary Examiner* — Jerry Blevins
(74) *Attorney, Agent, or Firm* — Osha Liang LLP (57) ABSTRACT

A connector to connect a fiber bundle probe to a light injection module including a tightening cam having an opening of a specified shape adapted to receive the fiber bundle probe, a cam driving coupled to the tightening cam, wherein the tightening cam is configured to translate in response to rotation of the cam driving until the tightening cam is blocked, at least one spring extending between the tightening cam and the cam driving, wherein the at least one spring is configured to resist when the cam driving is actuated by rotation and the tightening cam is blocked, and a locking mechanism to lock the cam driving into a selected position.

22 Claims, 5 Drawing Sheets (56) References Cited

U.S. PATENT DOCUMENTS

| | | | |
|---|---|---|---|
| 4,634,214 A * | 1/1987 | Cannon et al. | 385/86 |
| 5,333,225 A | 7/1994 | Jacobowitz et al. | |
| 5,369,721 A | 11/1994 | Conti | |
| 5,594,826 A | 1/1997 | Wood et al. | |
| 5,882,102 A | 3/1999 | Pileski | |
| 6,370,422 B1 | 4/2002 | Richards-Kortum | |
| 6,388,809 B1 | 5/2002 | MacAulay | |
| 6,504,964 B1 * | 1/2003 | Hasegawa | 385/16 |
| 2004/0096178 A1 * | 5/2004 | Jones et al. | 385/140 |
| 2005/0242298 A1 | 11/2005 | Genet et al. | |

FOREIGN PATENT DOCUMENTS

| | | |
|---|---|---|
| JP | S62-119508 A | 5/1987 |
| JP | 62-501588 A | 6/1987 |
| JP | S62-140755 A | 6/1987 |
| JP | S62-267710 A | 11/1987 |
| JP | H06-148465 A | 5/1994 |
| JP | H07-181399 A | 7/1995 |
| JP | 2000-010021 A | 1/2000 |
| JP | 2006-020715 A | 1/2006 |
| JP | 04-059811 B2 | 3/2008 |
| JP | 2008-220683 A | 9/2008 |
| JP | 05-019140 B2 | 9/2012 |
| JP | 05-224089 B2 | 7/2013 |

OTHER PUBLICATIONS

Written Opinion from PCT/IB2010/000969 dated Jul. 20, 2010 (8 pages).
Japanese Office Action issued in Japanese Patent Application No. 2011-553554, mailing date Jan. 7, 2014, with English translation thereof (8 pages).

* cited by examiner

CONNECTOR FOR A FIBER PROBE AND A FIBER PROBE ADAPTED TO SAID CONNECTOR

BACKGROUND

1. Field of the of the Present Disclosure

The disclosure relates to an optical probe based on a fiber bundle adapted to be connected to a light injection module and to a connector for such a probe.

2. Background Art

Figure 8:
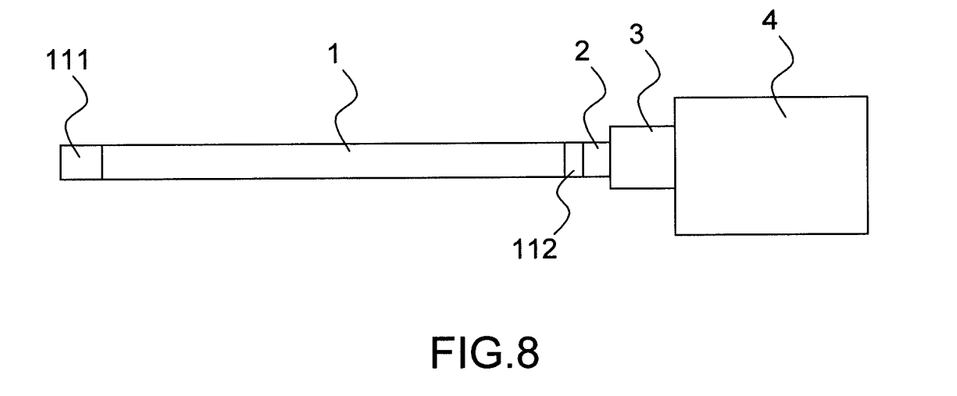
FIG. 8 is a schematic illustration of a confocal imaging system based on a fiber bundle probe.

The Applicant has developed a confocal imaging system based on a fiber bundle probe for in vivo in situ imaging of biological tissues as described for example in U.S. Patent Application 2005/0242298 which is fully incorporated herein by reference. Such a system is, for example, represented schematically on FIG. 8. A laser 4 is scanned over a proximal face 112 of the fiber bundle probe 1 which is connected to a light injection module 3 via a connector 2. The light injection module 3 comprises an objective ensuring that light from the laser is properly injected into each fiber of the fiber bundle probe. Scanning the proximal face of the fiber bundle results in a fiber per fiber injection of light and at a distal end 111 of the bundle in a point per point illumination of an object under observation. As a consequence, each illuminated point of the observed object may re-emit light which is collected and transported back to the proximal end 112 of the fiber bundle via the same fiber and finally transmitted to a detector through the same scanning process. In such a confocal system, the light of the laser is injected fiber per fiber into the whole field of view of the bundle, thereby requiring a high precision in light focusing and resulting in a tolerance of about 2 μm in the probe positioning relatively to the light injection module.

Several other systems currently integrate fiber bundles connected to light sources for imaging purposes. For example, U.S. Pat. No. 6,370,422 describes the use of a fiber probe based on a fiber bundle in reflectance imaging. U.S. Pat. No. 6,388,809 discloses an imaging system based on a fiber probe in which the scanning scheme is based on a specific Digital Micro-mirror Device (DMD) scanning architecture wherein each fiber core is addressed by individual mirrors of a DMD matrix.

These systems may integrate standard connectors such as Ferrule Connector/Physical Connector (FC/PC) or Sub Miniature A (SMA) connectors between the fiber bundle and the injection module. The longitudinal positioning of these connectors depends on a thread specification that may longitudinally displace about 15 μm. Therefore, using such connectors may require refocusing light and manually repositioning the fiber bundle relative to the light injection module. These manipulations may be done by skilled professionals but are not appropriate for use in a medical environment. In a medical environment, users expect an apparatus to be ready to use in a minimum amount of time and effort. Moreover, these connectors are not adapted to multiple reuse and present risks of scratching the fiber bundle proximal face.

The Applicant proposes hereinunder a connector between a fiber bundle probe and a light injection module capable of improving positioning accuracy, repeatability and resistance to shocks and vibrations. The Applicant also proposes a fiber bundle probe adapted to said connector.

SUMMARY OF THE CLAIMED SUBJECT MATTER

In at least one aspect, embodiments disclosed herein relate to a connector to connect a fiber bundle probe to a light injection module. The connector may include a tightening cam having an opening of a specified shape adapted to receive the fiber bundle probe and a cam driving coupled to the tightening cam, wherein the tightening cam is configured to translate in response to rotation of the cam driving until the tightening cam is blocked. The connector may include at least one spring extending between the tightening cam and the cam driving, wherein the at least one spring is configured to resist when the cam driving is actuated by rotation and the tightening cam is blocked. The connector may also include a locking mechanism to lock the cam driving into a selected position.

Other aspects and advantages of the disclosure will be apparent from the following description and the appended claims.

DETAILED DESCRIPTION

Specific embodiments of the present disclosure will now be described in detail with reference to the accompanying Figures. Like elements in the various Figures may be denoted by like numerals. Embodiments of the present disclosure relate an optical probe with a fiber bundle adapted to be connected to a light injection module and to a connector for connecting such a probe to a light injection module.

Figure 1:
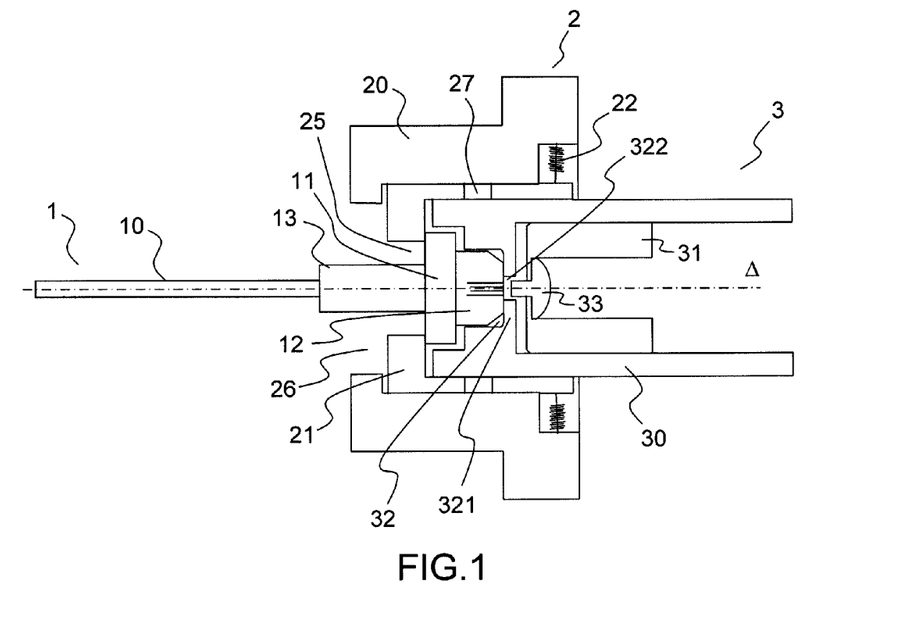
FIG. 1 is an illustration of a longitudinal section of a connector between a light injection module and a fiber probe according to an embodiment of the present disclosure.

FIG. 1 represents a fiber bundle probe 1, a light injection module 3 and a connector 2, according to an embodiment of the present disclosure. The fiber probe 1 is to be brought in contact with the light injection module 3 through the connector 2 along a longitudinal axis Δ. Notably, when the probe is brought in contact with the light injection module, the connector 2, according to embodiments disclosed herein, may enable tightening the fiber probe against the light injection module with a predetermined amount of coupling force.

The fiber bundle probe 1 comprises a fiber bundle 10, a collar 11, a mount 12 (e.g., made of stainless steel) and a guiding shoulder 13. The collar 11, the mount 12 and the guiding shoulder 13 form the tip of the probe. The (stainless steel) mount 12 may protect the tip of the fiber bundle 10 and collar 11 may enable pressure to be applied by the connector 2 to the probe 1 when the tip of the probe 1 is brought in contact with the light injection module 3 through the connector 2. The collar may also have a specific shape, for example an oriented slot, to allow the probe 1 to be inserted in the connector 2 at a desired orientation. In another embodiment, the fiber probe 1 may comprise a specific oriented slot. Furthermore, the guiding shoulder 13 may have a tubular shape and may, in one embodiment, allow the attachment of a plastic handle to the probe. The mount 12, the collar 11 and the guiding shoulder 13 may be coaxially assembled together, the mount 12 being at the extremity of the tip of the probe backed by the collar 11 to which is juxtaposed the guiding shoulder 13. In another embodiment, the collar may be alternatively placed, for example on the guiding shoulder 13. The guiding shoulder 13, the collar 11 and the mount 12, may comprise a hollow conduit for the fiber bundle to fit inside. The fiber bundle 10 fits inside the hollow conduit and arises at the extremity of the stainless steel mount 12. An example of a probe according to the disclosure will be described below.

In selected embodiments, the fiber probe 1 may be connected to a (tubular) frame 30 of the light injection module 3. When the fiber probe is connected to the light injection module 3, a first side of a wall 321 of the frame 30 may act as an end stop for an extremity of the probe. A mount 31, for example being tubular and comprising at least a lens 33, may be inserted in the frame 30 close to a second side of the wall 321 for the lens 33 to be close to the probe when the probe is brought in contact with the first side of the wall 321. The second side of the wall 321 may be in the inner part of the frame 30. The mount 31 and the at least one lens 33 form an objective. In selected embodiments, the lens 33 may be designed in a mushroom shape. In alternative embodiments, lens 33 may have a conical shape. These varied shapes may allow the objective to be placed at the right longitudinal position where light focus is optimized for each fiber on the whole field of view of the fiber bundle 10. The wall 321 may comprise a hole 322 and the objective may be centered relatively to the hole 322. The objective may be used to focus light from a light source (not shown) in the fiber bundle 10. When the probe is brought in contact with the wall 321, the fiber bundle 10 may face the hole 322. The first side of the wall 321 facing the probe 1 may be shaped in order to form a cavity 32. The cavity 32 may be geometrically adapted to receive both the mount 12 and the collar 11 of the probe 1 and for the fibers of the fiber bundle 10 to face the hole 322 when the mount 12 of the probe is inserted therein. A bottom part of the cavity 32 to receive the mount 12 when the probe is brought in contact with the light injection module may have a cylindrical shape, said cylinder having a diameter of about 10 mm and a length of about 7.2 mm. An upper part of the cavity to receive the collar when the probe is brought in contact with the light injection module may have an equilateral triangular prism shape, an edge of the triangle being of about 13 mm to 14 mm and a length of the prism being of about 3 to 5 mm.

The connector 2 may comprise a cam driving 20, a tightening cam 21 and elastic means 22 coupling the cam driving 20 and the tightening cam 21. In selected embodiments, the elastic means 22 may include one or more springs arranged tangentially and symmetrically with regard to the longitudinal axis along which the cam driving may be rotationally actuated. When the connector 2 is assembled to the light injection module 3, the connector 2 covers the wall 321 of the frame 30. The cam driving 20 and the tightening cam 21 respectively comprise a cam driving opening 26 and a tightening cam opening 25 for the tip of the probe 1 to be inserted through the connector in the light injection module 3.

In selected embodiments, at least one of the tightening cam opening 25 and the cam driving opening 26 may be adapted to enable orientating the probe longitudinally by, for example, having a specified shape corresponding to the shape of the collar 11. This may enable to determine how to insert the probe 1 into the connector 2. For example, the tightening cam 21 may have a triangular opening of certain dimensions and the collar 11 on the probe may have a plain triangular shape of same dimensions. In selected embodiments, the collar may have a rhombical shape. In alternative embodiments, the collar 11 may have an equilateral triangular shape. When the oriented slot and the tightening cam opening 25 have an equilateral triangular corresponding shape, the probe 1 may be inserted in the connector 2 according to three possible orientations along the longitudinal axis Δ. Additional geometric elements may be added to determine a preferred orientation among the three orientations.

The cam driving 20 may be actuated by a rotation relative to the longitudinal axis Δ. The elastic means 22 may couple the tightening cam 21 and the cam driving 20 so that rotation of the cam driving 20 rotates the tightening cam 21 and causes the tightening cam 21 to move towards the wall 321, thereby pushing on the collar 11 and squeezing the probe against the wall 321 of the frame 30. Turning the cam driving 20 may cause the tightening cam 21 to move helically towards the frame 30 so that when the tightening cam 21 and the collar are in contact, the triangular shapes of the tightening cam opening 25 and of the collar 11 do not match. Thus, the tightening cam may push on the collar. This may be performed using helical grooves 27 drawn on the tightening cam 21 and pins or screws mechanically coupling the tightening cam 21 and the frame 30 through said helical grooves. In selected embodiments, the cam driving 20 may translate together with the tightening cam 21.

In alternative embodiments, the cam driving 20 may not translate together with the tightening cam 21. When the movement of the tightening cam 21 is blocked, for example because of a contact between the tightening cam and the collar 11 of the probe 1 inserted in the cavity 32, a rotation of the cam driving 20 may further drive the tightening cam 21 and therefore may cause the elastic means 22 to strain. The elastic means 22 may establish a linearly increasing elastic force during the squeezing of the tip of the probe 1 on the frame 30. The elastic means 22 may also allow a repeatable force to be applied to lock the probe longitudinally. In selected embodiments, the elastic means 22 may be arranged in order to first unfold when the tightening cam 21 translates and then to start straining when the tightening cam 21 arrives in a position where it should be in contact with the collar 11 of the probe 1 if the probe was inserted in the connector 2. Further, blocking the elastic means 22 by for example blocking the cam driving 20 on a determined tightening position, may result in applying a constant tightening force to the locking. This may, for example, ensure a strong mechanical resistance to shocks and vibrations and increase repeatability of the probe 1 positioning. A locking device (not shown) may then ensure locking of the connector 2. This may allow the probe 1 to stay at an operating position and may ensure that a preliminary calibration process remains valid during a use of the probe 1 with an imaging system. In an embodiment, the probe 1 is plugged in the cavity 32 through the connector 2 assembled to the light injection module 3, the tightening cam 21 performs an helical movement when the cam driving 20 is actuated and a distance between the extremity of the probe and the collar 11 may be adapted for the tightening cam 21 to come into contact with the collar 11 when the tightening cam has turned of about 180°.

Figure 2:
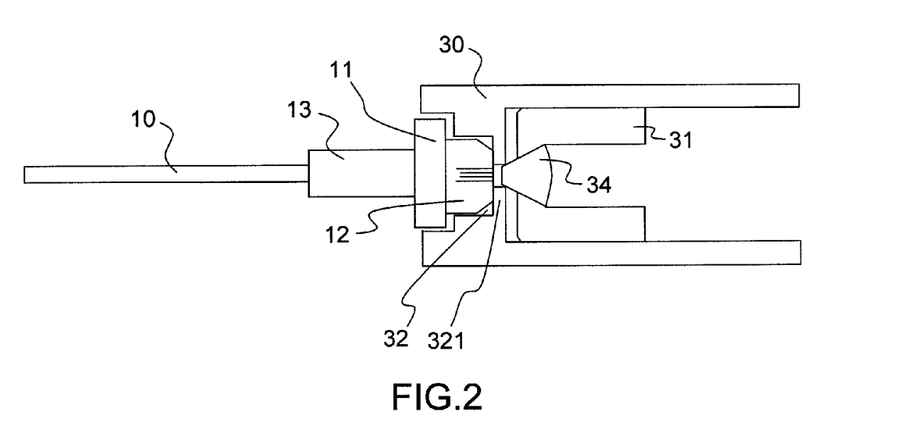
FIG. 2 represents a longitudinal section of a fiber probe in contact with a frame of a light injection module according to an embodiment of the present disclosure.

FIG. 2 depicts the tip of the fiber bundle probe 1 in contact with the frame 30 of the light injection module; the connector (2 from FIG. 1) is not shown in FIG. 2. As shown, the mount 31 inserted in the frame 30 comprises a conical lens 34. In another embodiment (e.g., in FIG. 1, above), the lens may have a mushroom shape. The wall 321 of the frame 30 may comprise a centered hole and the thickness of the wall 321 around the hole may be about 1 mm to resist deformations. In order to properly inject light in the fibers of the fiber bundle 10, the surface of the last lens 34 of the objective 31 may be placed at a distance of around 0.5 mm from the fiber bundle surface corresponding to a working distance of said objective 31. The objective 31 may be adjusted close to the inner side of the wall of the frame 321 and the lens may be designed in a conical shape. This design allows the objective 31 (or lens 34) to be close to the fibers of the bundle and light to focus correctly on a plane corresponding to a face of the bundle.

Figure 3A:
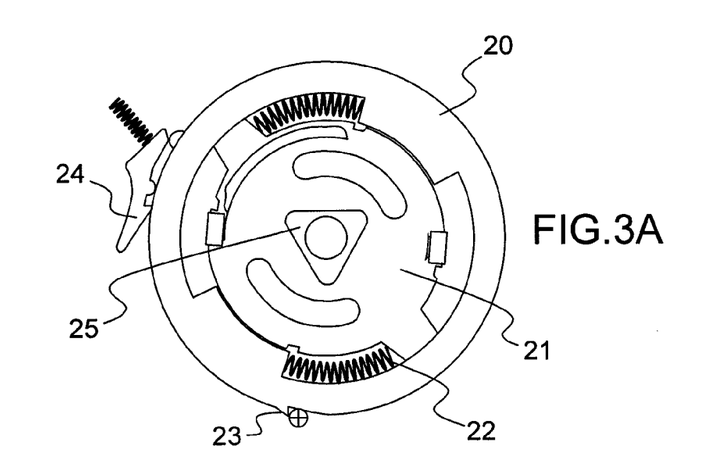
FIG. 3a, FIG. 3b and FIG. 3c are transverse sections of a connector illustrating several phases a probe locking according to an embodiment of the present disclosure.
Figure 3B:
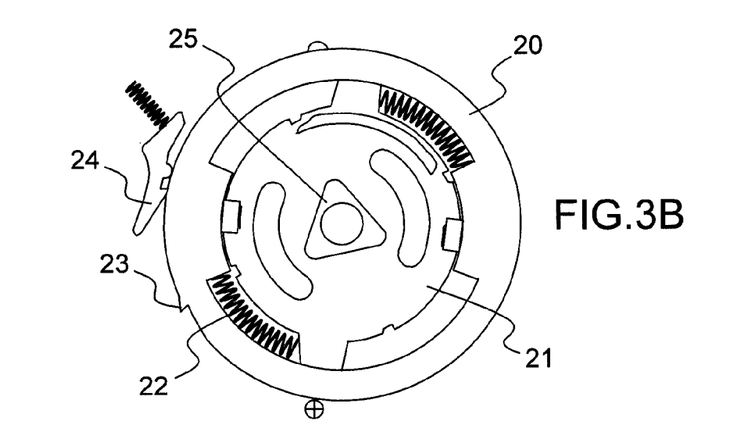
Figure 3C:
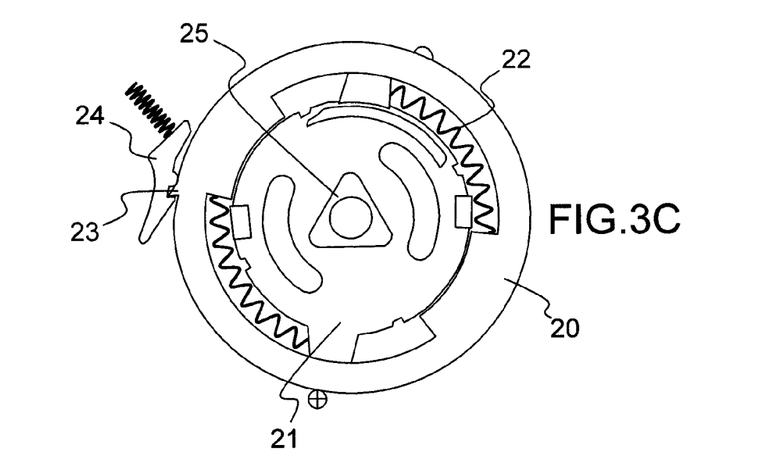

FIGS. 3A to 3C illustrate several phases of the probe connection according to embodiments of the present disclosure. Element 23 is a male projection of a locking device placed on the cam driving 21. Element 24 is a corresponding female receptacle part of the locking device placed on a support of the frame (not shown). The locking device enables to lock the cam driving 21 into a determined tightening position. It may therefore allow one to intuitively determine when a probe is properly positioned with respect to the light injection module. In selected embodiments, the locking device may be any of push-lock device, a push-push device and a push-eject device. Such configurations allow for the easy and intuitive unlocking of the probe from the light injection module. The cam driving opening 26 may be wide, and the cam driving 20 may have a substantially circular shape.

FIG. 3A represents an unlocked position of the connector 2. The male part 23 of the locking device is down, the tightening cam opening 25 is aligned with the hole of the frame (not shown) and the springs 22 are not strained. In this position, a fiber probe 1 having a collar 11 whose shape corresponds to the shape of the tightening cam opening 25 may be brought in contact with the wall 321 of the frame 30 and plugged in the cavity 32.

FIG. 3B represents an intermediate phase of the probe 1 connection. In this phase, the cam driving 20 may be turned, resulting in a movement of the tightening cam 20 towards the frame 30. The cam driving 20 stays in a plane. The tightening cam 21 may be progressively brought in contact of the collar 11 of the probe 1 in this phase. The tightening cam 21 may perform a helical movement so that when the tightening cam 21 and the collar 11 are to be in contact, the triangular shapes of the tightening cam 21 and of the collar 11 do not match, enabling the tightening cam 21 to push on the collar. When the movement of the tightening cam 21 may be blocked by a contact with the collar 11 of the probe 1 and the cam driving 20 is further turned, the tightening cam 21 may push on the collar 11 resulting in squeezing the tip of the probe 1 against the frame with a linearly increasing elastic force due to springs 22 straining. FIG. 3B represents an intermediate phase before a contact between the tightening cam 21 and the collar 11 of the probe. The springs 22 may be unfolded along a helical movement (not shown), following the movement of the tightening cam 21.

FIG. 3C represents a locked position of the connector 2. In this position, the male and female part of the locking device may block the cam driving 20 in a tightening position. This position may be determined to allow the tightening cam 21 to enter in contact with the collar 11 and to push the probe 1 on the frame, resulting in straining the springs 22 with a determined force. Blocking the system on the tightening position may allow a determined constant force to squeeze the fiber probe 1 on the frame of the objective. This constant force may depend on the spring rate and on the tightening position determined by the position of the female locking device 24.

Figure 4A:
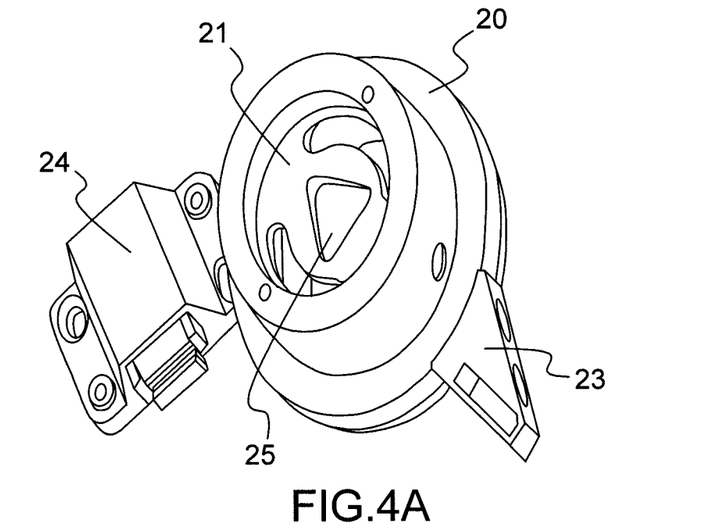
FIG. 4a and FIG. 4b are front and rear perspective views of a connector according to an embodiment of the present disclosure.
Figure 4B:
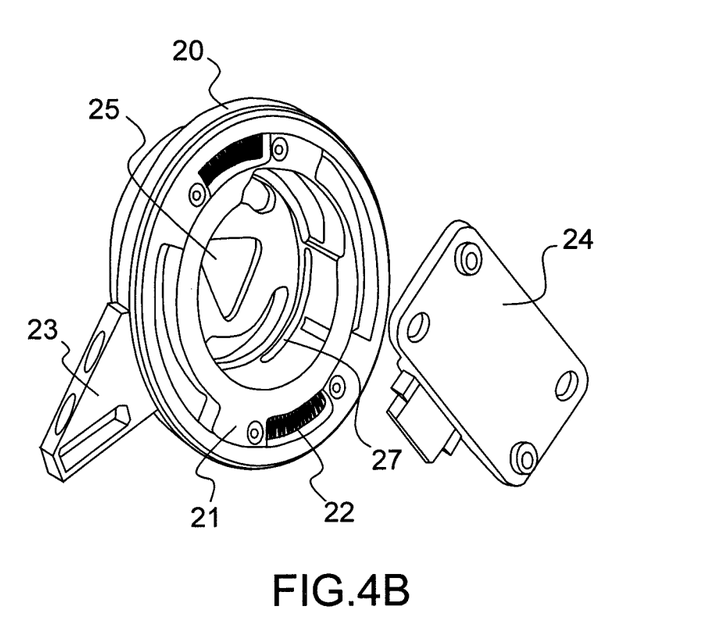

FIGS. 4A and 4B depict front and back perspective views of the connector 2 in accordance with embodiments disclosed herein. The opening 25 of the tightening cam 21 may have a triangular shape. The male and female parts 23 and 24 of the locking device may form a push-lock device. Helical grooves 27 may be used to receive pins and to couple the tightening cam 21 to the frame 30. In selected embodiments, the cam driving 21 may be actuated by a motor.

Figure 5:
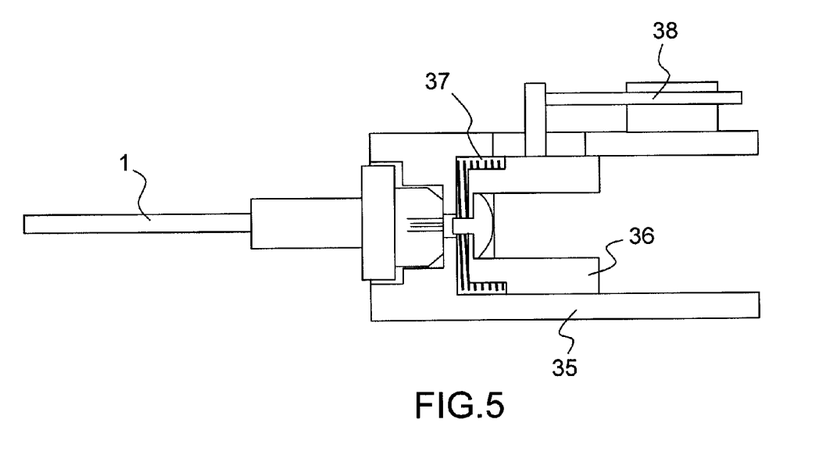
FIG. 5 represents a fiber probe in contact with a frame of a light injection module according to an embodiment of the present disclosure.

FIG. 5 depicts a fiber probe 1 in contact with an advanced frame 35 (connector 2 not shown). In this embodiment, a linear micro-motor 38 may be added to automatically translate a mount 36 relative to a wall of frame 35. A soft spring 37 may permit the mount to perform a movement back towards an opposite direction.

Figure 6A:
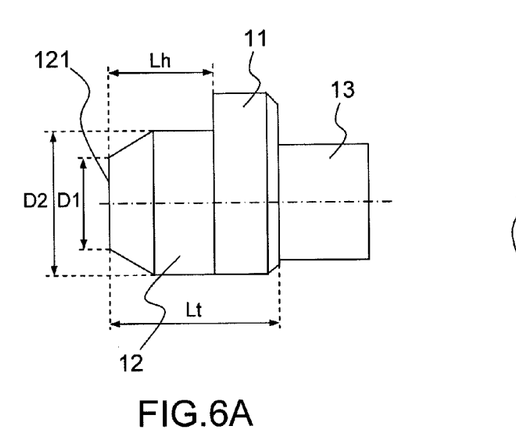
FIGS. 6A and 6B are respectively a longitudinal section and a front view of a tip of a fiber probe according to an embodiment of the present disclosure.
Figure 6B:
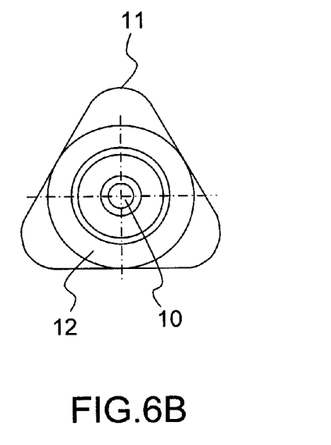
Figure 7:
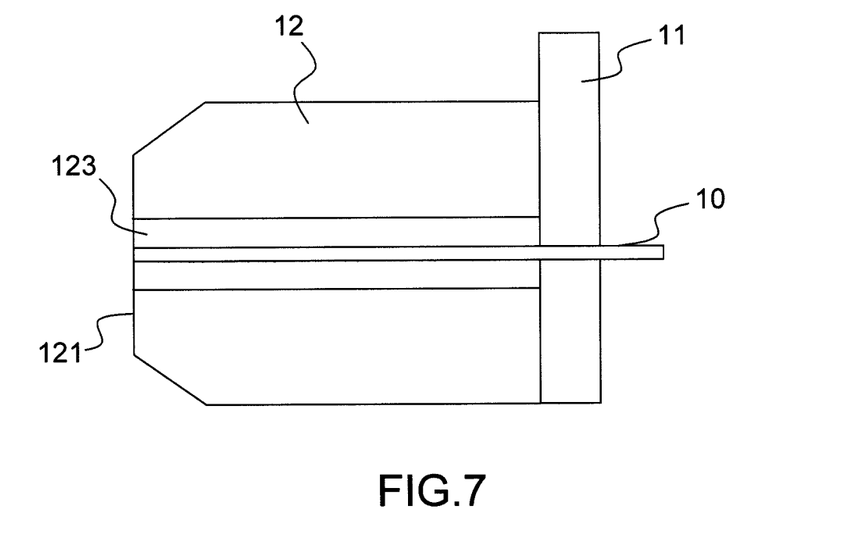
FIG. 7 is a longitudinal section of a mount of a fiber probe according to an embodiment of the present disclosure.

A fiber probe according to the present disclosure is now described in reference to FIG. 6A, FIG. 6B and FIG. 7.

The probe according to embodiments in accordance with the present disclosure may comprise a fiber bundle 10 protected by a ferrule 123 mounted in a hollow conduit of a mount 12 made of, for example, stainless steel. It may also comprise a collar 11 having a shape adapted to a geometry of an opening in the connector so as to act as a orienting slot. Advantageously, the shape of the collar 11 may be a triangle, the corners of which may be rounded, as shown proximate to item 11 in FIG. 6B. According to embodiments disclosed herein, an end of the probe may be polished resulting in a polished surface 121 that may be brought in contact with the frame of the light injection module when the probe is inserted in the connector. The polishing may be performed using known polishing techniques to obtain the polished surface 121 with a flatness of less than 2.5 µm over a surface of a diameter of around 10 mm. A tilt of the polished surface may be of less than 0.19° using specific tools developed specifically for the polishing. In selected embodiments, the ferrule 123 may be made of a material having substantially the same mechanical properties than the fiber bundle in order to ease the polishing. In alternative embodiments, the fiber bundle 10 may be mounted directly in the hollow conduit of the mount 12. The mount 12 may have a cylindrical shank and a flat ogive tip, the collar 11 may have an equilateral triangular prism shape. In selected embodiments, a length Lh between the polished end of the probe 121 and the triangular collar may be about 7.2 mm, a diameter D1 of the flat tip of the probe may be about 6.4 mm, a large diameter D2 of the mount may be about 10 mm, a total length Lt of the mount including the collar 11 may be about 11.6 mm, and the collar may have a length of about 4.4 mm.

Embodiments disclosed herein may also relate to an imaging system comprising a light source, a fiber bundle probe according to the present disclosure, connected to a light injection module using the connector as described above. In an embodiment, the imaging system further comprises a laser isolator such as a quarter-wave plate. This may prevent interference between a face of the bundle and an optical cavity of the light source, particularly when the light source is a laser with a large coherence length.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosed invention should be limited only by the attached claims.

What is claimed is:

1. A connector to connect a fiber bundle probe to a light injection module, said connector comprising:

a tightening cam having an opening of a specified shape adapted to receive the fiber bundle probe;
a cam driving coupled to the tightening cam,
wherein the tightening cam is configured to translate in response to rotation of the cam driving until the tightening cam is blocked;
at least one spring extending between the tightening cam and the cam driving, the at least one spring configured to resist when the cam driving is actuated by rotation and the tightening cam is blocked; and
a locking mechanism to lock the cam driving into a selected position.

2. The connector according to claim 1, wherein the tightening cam performs a helical movement when the cam driving is actuated by rotation.

3. The connector according to claim 1, wherein a coupling between the tightening cam and the cam driving comprises two springs arranged tangentially with regard to a rotation axis of the cam driving.

4. The connector according to claim 1, wherein the locking mechanism comprises one selected from a group consisting of a push-lock device, a push-push device and a push-eject device.

5. The connector according to claim 1, wherein the locking mechanism comprises male and female elements, wherein one of the male and female elements is fixed to the cam driving and the other of the male and female elements is fixed to a wall of the light injection module.

6. The connector according to claim 1, wherein the cam driving is actuated using a motor.

7. The connector according to claim 1, wherein the specified shape comprises one selected from the group consisting of a triangle, a triangle with rounded corners, and a square and a rhombus.

8. A fiber bundle probe configured to be connected to a light injection module using a connector according to claim 1, the fiber bundle probe comprising:
a mount comprising a hollow conduit;
a fiber bundle to transport light; wherein a tip of the fiber bundle is configured to fit in the hollow conduit at an extremity of the mount; and
a collar arranged at the side of the mount, the collar comprising a corresponding shape adapted to fit in the opening of the tightening cam of the connector,
wherein the extremity of the mount and the fiber bundle are polished to form a flat surface.

9. The fiber bundle probe according to claim 8, wherein polishing of the extremity of the mount and the fiber bundle is performed with a flatness of less than 3 μm and with a tilt of less than about 0.2°.

10. The fiber bundle probe according to claim 8, wherein the corresponding shape comprises one selected from a group consisting of a triangle with rounded corners, a triangle, and a rhombus and a square.

11. The fiber bundle probe according to claim 8, wherein a distance between the extremity of the mount and the collar is about 7 mm.

12. The fiber bundle probe according to claim 8, wherein the mount is made of stainless steel.

13. A fiber bundle probe configured to be connected to a light injection module using a connector according to claim 1, the fiber bundle probe comprising:
a fiber bundle to transport light;
a tubular ferrule configured to sheath a tip of the fiber bundle;
a mount comprising a hollow conduit, the tubular ferrule configured to fit in the hollow conduit at an extremity of said mount; and
a collar arranged at the side of the mount, the collar comprising a corresponding shape adapted to fit in the opening of the tightening cam of the connector,
wherein the extremity of the mount, the fiber bundle, and the ferrule are polished to form a flat surface.

14. The fiber bundle probe according to claim 13, wherein polishing of the extremity of the mount, the fiber bundle, and the ferrule is performed with a flatness of less than about 3 μm and with a tilt of less than about 0.2°.

15. The fiber bundle probe according to claim 13, wherein the ferrule is made of glass.

16. The fiber bundle probe according to claim 13, wherein the corresponding shape comprises at least one selected from a group consisting of a triangle with rounded corners, a triangle, and a rhombus and a square.

17. The fiber bundle probe according to claim 13, wherein a distance between the extremity of the mount and the collar is about 7 mm.

18. An imaging system comprising:
a light injection module,
a fiber bundle probe a fiber bundle to transport light; and
a connector according to claim 1, wherein the fiber bundle probe is connected to the light injection module using the connector.

19. The imaging system according to claim 18, wherein the light injection module comprises an objective facing the fiber bundle when the fiber bundle probe is connected to the light injection module using the connector, and wherein the objective comprises at least one lens selected from a group consisting of a mushroom shaped lens and a conic shaped lens.

20. The imaging system according to 19, wherein a position of the objective is adjusted using a motorized system.

21. The imaging system according to claim 19, wherein the connector is assembled to a wall of the light injection module and a tip of the fiber bundle probe is inserted in a cavity of the wall through the connector, the cavity having a shape adapted to receive a mount of the fiber bundle probe.

22. The imaging system according to claim 18, wherein the light injection module comprises a laser source and a laser insulator.

* * * * *